(12) United States Patent
Gearhart

(10) Patent No.: US 7,032,344 B2
(45) Date of Patent: Apr. 25, 2006

(54) FISHING LURE ENHANCEMENT

(76) Inventor: Randy Gearhart, 3510 S. Osage, Independence, MO (US) 64055

( * ) Notice: Subject to any disclaimer, the term of this patent is extended or adjusted under 35 U.S.C. 154(b) by 0 days.

(21) Appl. No.: 10/786,910

(22) Filed: Feb. 25, 2004

(65) Prior Publication Data

US 2005/0183322 A1    Aug. 25, 2005

(51) Int. Cl.
*A01K 85/00* (2006.01)

(52) U.S. Cl. .................... 43/42.26; 43/42.24; 43/42.27

(58) Field of Classification Search ............. 43/42.22, 43/42.24, 42.25, 42.26, 42.27, 42.28, 42.4, 43/42.41; D22/128
See application file for complete search history.

(56) References Cited

U.S. PATENT DOCUMENTS

| | | | | |
|---|---|---|---|---|
| 1,454,820 A | * | 5/1923 | Readle | 43/42.05 |
| 1,604,027 A | | 10/1926 | Dills | |
| 1,734,346 A | * | 11/1929 | Reinhardt | 43/42.25 |
| 2,018,622 A | * | 10/1935 | Davenport | 43/42.53 |
| 2,148,799 A | * | 2/1939 | Bilinski | 43/42.53 |
| 2,168,894 A | * | 8/1939 | Arbogast | 43/42.49 |
| 2,384,993 A | * | 9/1945 | Goddard et al. | 43/42.25 |
| 2,492,064 A | | 12/1949 | Rauh | |
| 2,523,949 A | * | 9/1950 | Gambill | 43/42.28 |
| 2,567,180 A | * | 9/1951 | Bunkowski | 43/42.28 |
| 2,612,717 A | * | 10/1952 | Kuehnel | 43/42.14 |
| 2,738,610 A | * | 3/1956 | Rice | 43/26.2 |
| 2,883,785 A | * | 4/1959 | Croft | 43/42.09 |
| 3,461,598 A | * | 8/1969 | Brewster | 43/44.97 |
| D222,058 S | | 9/1971 | Meadors | |
| 3,902,266 A | * | 9/1975 | Howard | 43/42.13 |
| 3,959,912 A | | 6/1976 | Lee | |
| 4,135,323 A | * | 1/1979 | Esten | 43/42.16 |
| D264,868 S | | 6/1982 | Beavers | |
| 4,536,986 A | | 8/1985 | Stout | |
| 4,596,086 A | | 6/1986 | Garland | |
| 4,744,167 A | | 5/1988 | Steele | |
| 5,031,350 A | | 7/1991 | Rabideau | |
| 5,127,183 A | * | 7/1992 | Wulff | 43/42.25 |
| 5,201,859 A | * | 4/1993 | Rosek | 43/42.19 |
| 5,251,395 A | | 10/1993 | Wicklund | |
| 5,261,182 A | | 11/1993 | Link | |
| 5,361,531 A | * | 11/1994 | Rodrigues | 43/42.09 |
| 5,709,047 A | | 1/1998 | Link | |
| 5,899,015 A | | 5/1999 | Link | |
| 6,418,659 B1 | * | 7/2002 | Shelton | 43/42.53 |
| 6,564,499 B1 | | 5/2003 | Firmin | |

\* cited by examiner

*Primary Examiner*—Peter M. Poon
*Assistant Examiner*—David Parsley
(74) *Attorney, Agent, or Firm*—Chase Law Firm, L.C.

(57) ABSTRACT

A fishing lure enhancement including multiple flexible primary legs projecting from a central hub, each primary leg formed of two or more flexible secondary legs. Primary legs are adapted to protect the lure from entanglement with weeds and other obstructions as well as providing pulsed motion during intermittent retrieval. Secondary legs are adapted to flare during pulsed retrieval and provide individual secondary motion.

3 Claims, 5 Drawing Sheets

FISHING LURE ENHANCEMENT

FIELD OF THE INVENTION

The present invention relates to fishing lures and, in particular, to fishing lure enhancements providing primary and secondary radial projections for enhanced lure motion and protection from weeds.

BACKGROUND OF THE INVENTION

It is known to use multifilament skirts in association with fishing lures to enhance attractiveness to game fish and to protect the lure, with varying degrees of success, from unwanted entanglement or engagement with weeds or submerged obstructions such as limbs and rocks. Such devices typically comprise soft, silicone-based, elastomeric filaments and typically are attached behind a lure head such that the filaments extend rearward from the attachment point. The filaments are often produced in colors anticipated to attract game fish and may include or incorporate strands or flecks of reflective material.

Often such multifilament skirts are combined with single hooks for use with live bait such as worms, crayfish or minnows, or with treble hooks often provided with artificial lures. In use, such filaments typically trail behind the head of a lure as the lure is pulled through a body of water such as a lake or river, the primary advantages of such filaments being enhancement of lure motion and color.

Many of such filaments are too flexible and soft to effectively deflect weeds or protect the hook from snagging on underwater obstructions. Those that do effectively protect the hook typically comprise a stiff plastic extension or a bundle of stiff plastic fibers positioned ahead of the hook point to deflect weeds away from the hook point as it is pulled through the water and to deflect the hook itself from snagging underwater obstructions. The effectiveness of such structures at protecting the lure, however, also tends to reduce the ability of the hook to engage the mouthparts of a striking fish. Other multifilament devices essentially surround the lure in a basket or cone of rearward projecting filaments. While presumably effective, the attractive motion of such a device is typically limited to undulation of the filaments as the device is drawn through the water.

BRIEF SUMMARY OF THE INVENTION

A fishing lure enhancement device including a central hub and a plurality of flexible primary legs or projections extending radially outward from the hub in a common plane. Each of the primary legs comprises two or more flexible secondary legs. The primary legs are adapted to exhibit first order movements and the secondary legs are adapted to exhibit second order movements. These movements are in response to forces exerted upon the legs during movement of the device through a body of water. The hub includes an aperture extending the center of the hub. The aperture is dimensioned and configured to allow passage of a fishing line through the hub when securing the device near a lure.

The device may be fabricated from a rubber-like material, important qualities being flexibility and resilience. The primary legs should exhibit sufficient resilience to remain partially extended when the device and associated lure are allowed to rest on the bed of a lake, river or other body of water. In addition, the legs should exhibit sufficient flexibility to bend partially rearward when the device is retrieved through a body of water, yet spring forward when retrieval is paused. The device is thereby particularly designed to exhibit a pulsing motion when retrieval is performed with frequent short pauses, the action of the device generally simulating that of a jellyfish. During pulsed or intermittent retrieval, the primary legs provide pulsed forward and rearward motion. Secondary legs are adapted to flare during pulsed retrieval and provide individual secondary movement.

DETAILED DESCRIPTION

Figure 1:
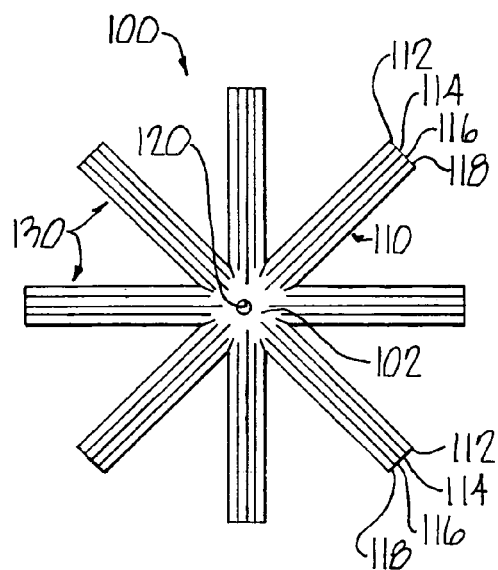
FIG. 1 is a plan view of a device in accordance with the present invention.

Referring more particularly to the figures, FIG. 1 is a plan view of a fishing lure enhancement device 100 in accordance with the present invention. The device 100 includes a central hub area 102 and eight flexible major projections such as primary legs 110 extending radially outward from the hub 102 in a common plane. Each of the primary legs 110 is formed from four flexible minor projections such as secondary legs 112, 114, 116, 118. The hub 102 includes an aperture 120 extending through the center of the hub 102. The aperture 120 is dimensioned and configured to allow passage of a fishing line 10 through the hub 102 when securing the device near a lure (see FIGS. 3–9).

Figure 2:
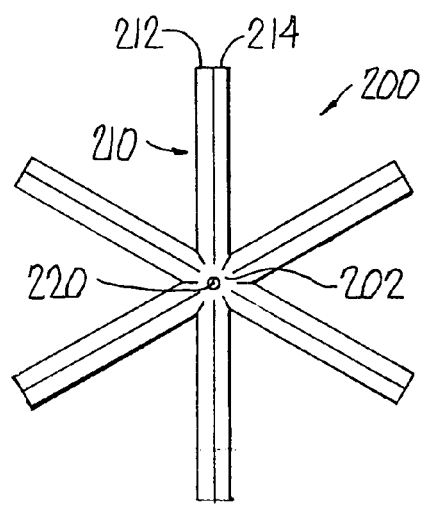
FIG. 2 is a plan view of an alternative embodiment of the device of FIG. 1.

FIG. 2 is a plan view of an alternative embodiment 200 of a fishing lure enhancement device. As illustrated, the alternative embodiment 200 includes six primary legs 210 projecting radially from a center hub 202. Each of the primary legs 210 includes two secondary legs 212 and 214. An aperture 220 extends through the center of the hub 202. It should be appreciated that other embodiments utilizing various numbers of primary and secondary legs are contemplated by the present invention.

Figure 3:
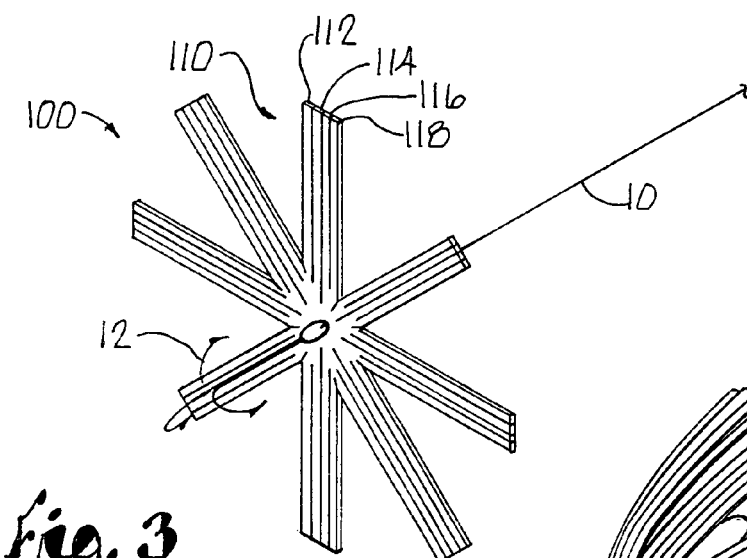
FIG. 3 is a rear perspective view of the device of FIG. 1 showing the device engaged with a fishing hook and fishing line.
Figure 4:
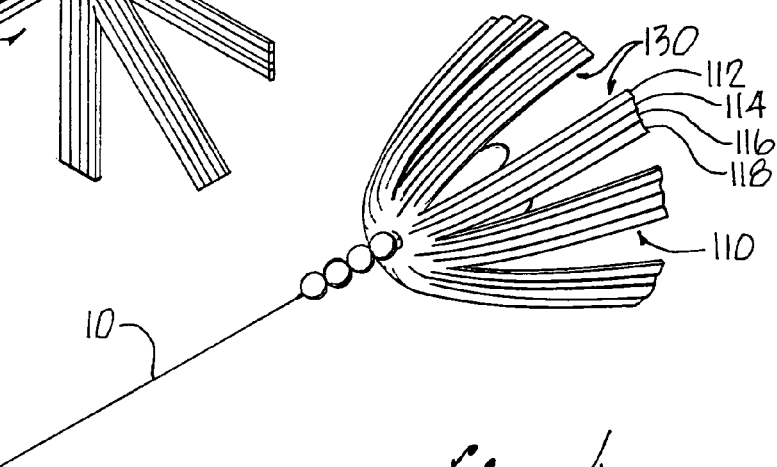
FIG. 4 is a front perspective view illustrating a rearward disposition of the legs as may occur when the device is retrieved through a body of water.

FIG. 3 is a rear perspective view of the device 100 of FIG. 1 in which the device is shown engaged with a fishing hook 12 and fishing line 10. FIG. 4 is a front perspective view of the device 100 illustrating the rearward disposition of the legs 110 as may occur when the device 100 is retrieved through a body of water. As illustrated, the secondary legs 112, 114, 116, 118 within a given primary leg 110 tend to remain in close proximity to one another. The gaps 130 between the primary legs 110, while closing somewhat, are retained, thereby presenting a ready passage therethrough for the associated hook 12 during a strike by a fish.

Figure 5:
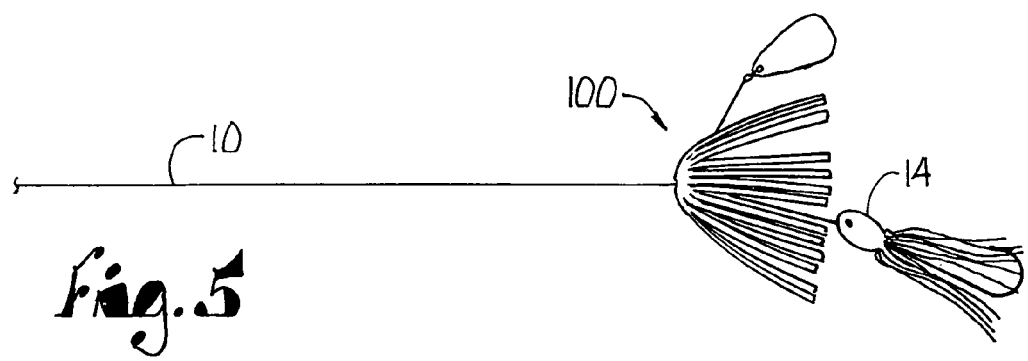
FIG. 5 is a side view of the device associated with a fishing lure such as a spinner bait.
Figure 6:
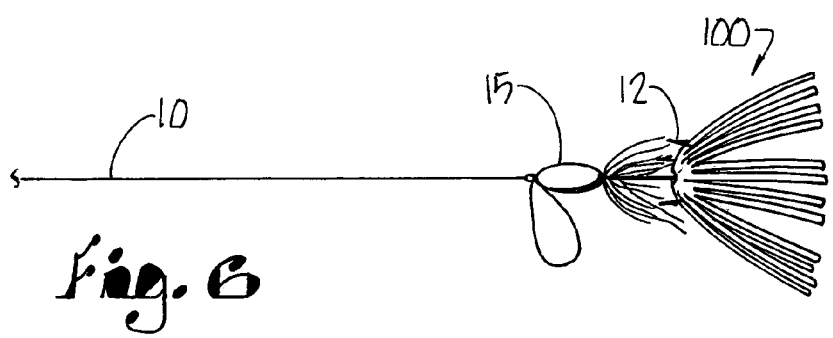
FIG. 6 is a side view of the device associated with a fishing lure such as a rooster tail by placement behind the lure and engagement with a fishing hook.
Figure 7:
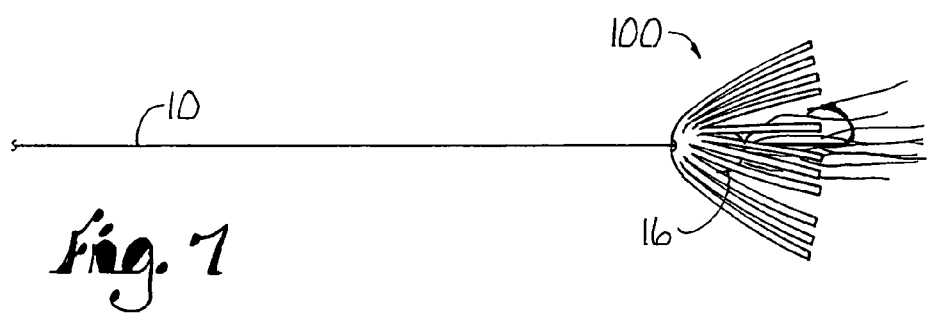
FIG. 7 is a side view of the device associated with a fishing lure such as a jig.

FIG. 5 is a side view of the device 100 threaded through a fishing line 10 and placed in front of a fishing lure such as a spinner bait 14. FIG. 6 is a side view of the device 100 associated with a fishing lure such as a rooster tail 15 by placement behind the lure and engagement with a fishing hook 12. The device 100 may be arranged so that the tips of the hook 12 project slightly through gaps between the primary legs 110 or secondary legs 112, 114, 116, 118. FIG. 7 is a side view of the device 100 threaded through a fishing line 10 and placed in front of a fishing lure such as a simple jig 16.

Figure 8:
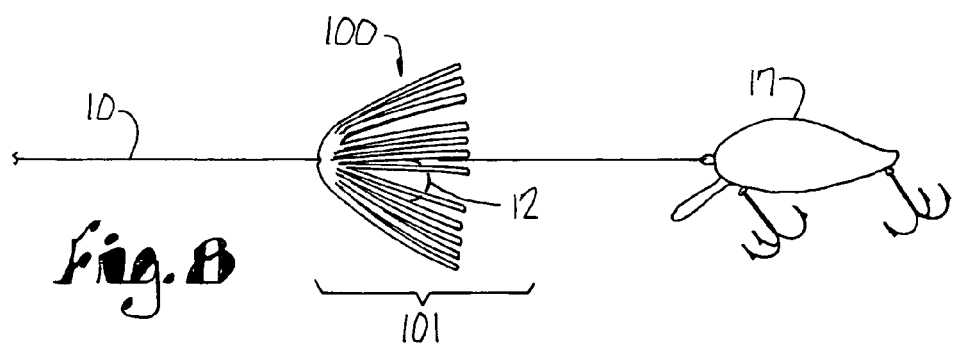
FIG. 8 is a side view of the device associated with a fishing lure by placement ahead of a crank bait and engagement with a fishing hook.

FIG. 8 is a side view of the device 100 associated with a fishing lure by placement on the line 10 ahead of a primary lure such as a crank bait 17 to simulate a predator chasing the device 100. The device 100 is engaged with a fishing hook 12 to create a secondary lure 101. This presentation entices surrounding fish as it simulates normal feeding behavior. When striking, a fish may miss the secondary lure 101 and, having its aggression aroused, direct a second strike towards the primary lure 17.

The device 100 may be fabricated from a rubber-like material, advantageous qualities being flexibility and resilience. The primary legs 110 should exhibit sufficient resilience to remain partially extended when the device 100 and associated hook 12 and/or lure are allowed to rest on the bottom of a body of water. In addition, the legs 110 should exhibit sufficient flexibility to bend partially rearward when the device 100 is retrieved through a body of water, yet spring forward when retrieval is paused. The device 100 is thereby particularly adapted to exhibit a pulsing motion when retrieval is performed with frequent short pauses, the action of the device generally simulating that of a jellyfish.

Figure 9:
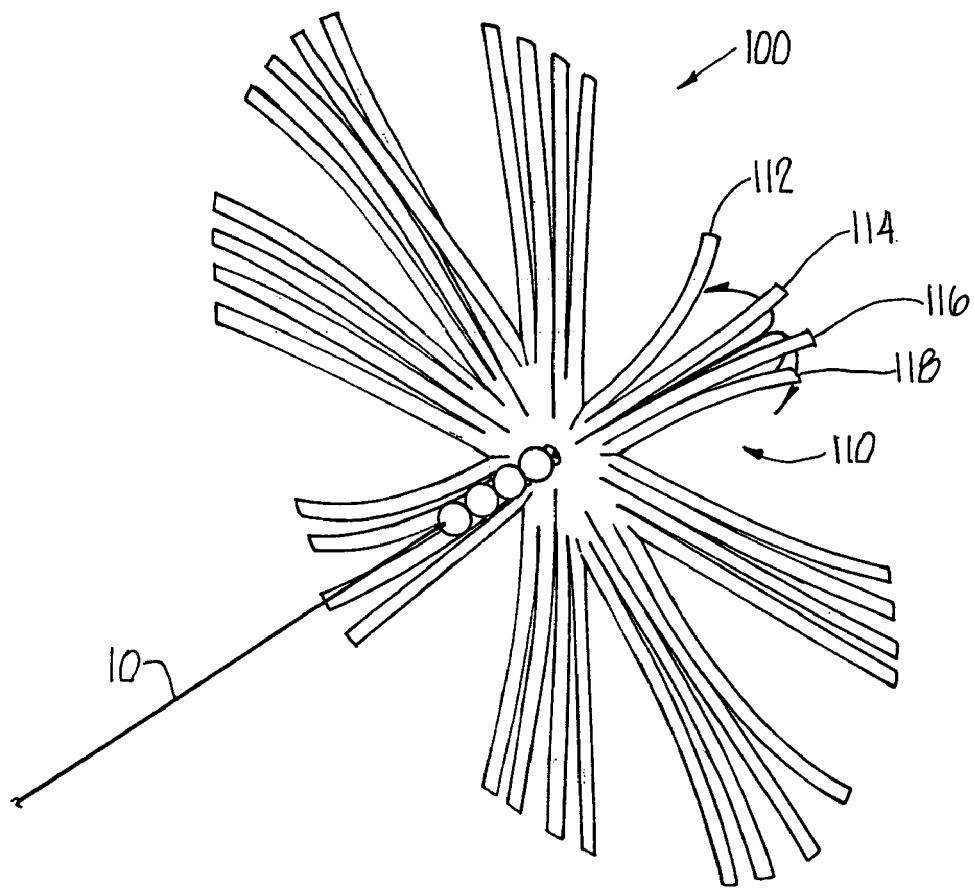
FIG. 9 is a front perspective view of the device of FIG. 1 illustrating independent disposition of the legs when the device is paused during retrieval through a body of water.

FIG. 9 is a front perspective view of the device 100 illustrating partial, independent disposition of the primary legs 110 and secondary legs 112, 114, 116, 118 when the device 100 is paused during retrieval through a body of water. The primary legs 110 are adapted to exhibit first order movements and the secondary legs 112, 114, 116, 118 are adapted to exhibit second order movements. These movements are in response to forces exerted upon the legs during movement of the device 100 through a body of water. First order movements of the primary legs 110 create the overall pulsing motion, while second order movements of the secondary legs 112, 114, 116, 118 create more subtle and varied movements adapted to further entice game fish. As forward retrieval of the device 100 is paused, the secondary legs tend to separate, as shown in FIG. 9, causing the device 100 to mutate from an eight legged to thirty-two legged presentation.

Figure 10:
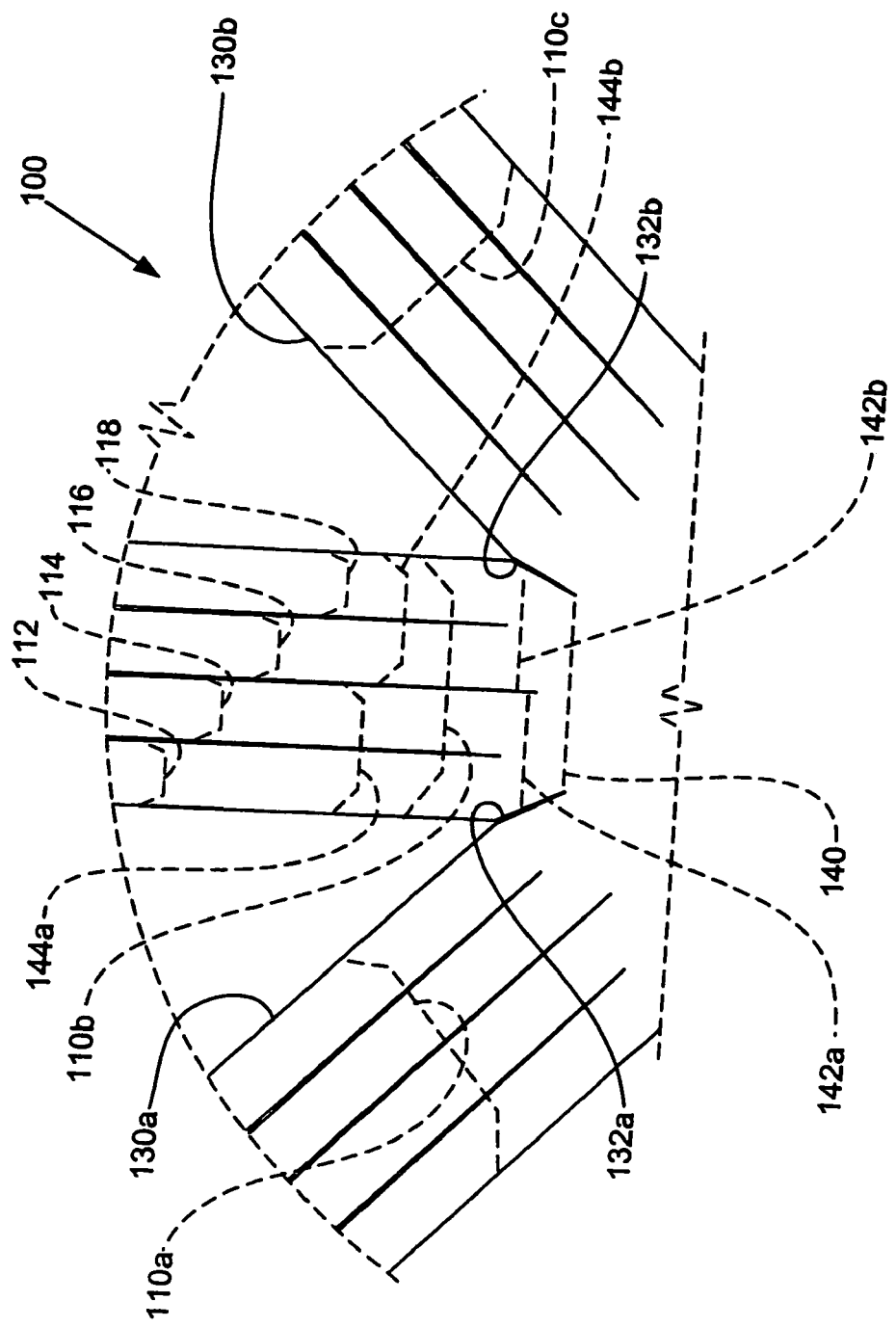
FIG. 10 is a diagram illustrating a portion of a fishing lure enhancement device, including three primary legs and twelve associated secondary legs.

FIG. 10 is a diagram illustrating a portion of a fishing lure enhancement device including three primary legs 110a, 110b and 110c projecting from a hub. As illustrated, this embodiment includes four secondary legs 112, 114, 116, 118 associated with each primary leg. Primary legs 110a, 110b and 110c are defined and divided from one another by gaps 130a and 130b. Primary leg 110b is further separated from primary legs 110a and 110c by slits 132a and 132b such that primary leg 110b may bend about axis 142, shown in phantom lines. Secondary legs 112, 114, 116, 118 may bend more freely about individual axes due to the reduced axis widths. In this embodiment, a tertiary system is formed through intermediate legs 144a and 144b which may bend about axes 142a and 142b respectively.

Figure 11:
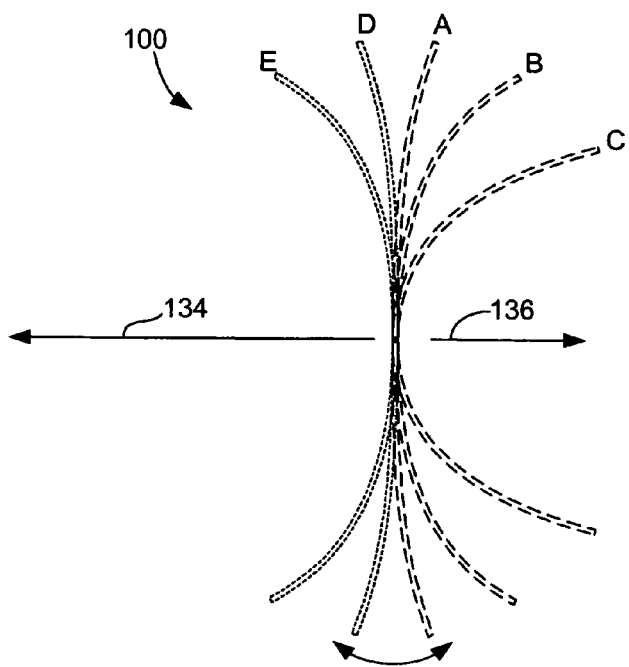
FIG. 11 is a diagrammatical side view of the device illustrating relative positioning of the legs during pulsed retrieval.

FIG. 11 is a diagrammatical side view of the device 100 illustrating relative forward and rearward positioning of the primary legs during pulsed retrieval. It should be appreciated that forward and rearward movement of the secondary legs substantially follows that of the primary legs with slight deviations as indicated in FIG. 9. In FIG. 11, arrow 134 indicates forward motion of the device 100, as occurs during retrieval after casting, as well as indicating relative strength of forward motion or pulse generated during retrieval. Smaller arrow 136 indicates rearward motion or recoil immediately following a forward pulse. Exemplary positions of the legs during various phases of a pulse cycle are indicated by lines labeled A through E. Starting with position A, as may occur under slight forward motion, the legs bend rearward to position B as forward motion is accelerated. Position C shows the legs bent rearward during maximum forward velocity. As forward motion slows, the legs recoil forward to positions B then A, and then continue forward to positions D and then E. If forward motion is halted the legs will typically assume a disposition generally intermediate to positions D and A. The cycle described above may be repeated through multiple cycles during retrieval of the device 100, thereby creating substantial, pulsed, forward and rearward movement of the legs.

Figure 12:
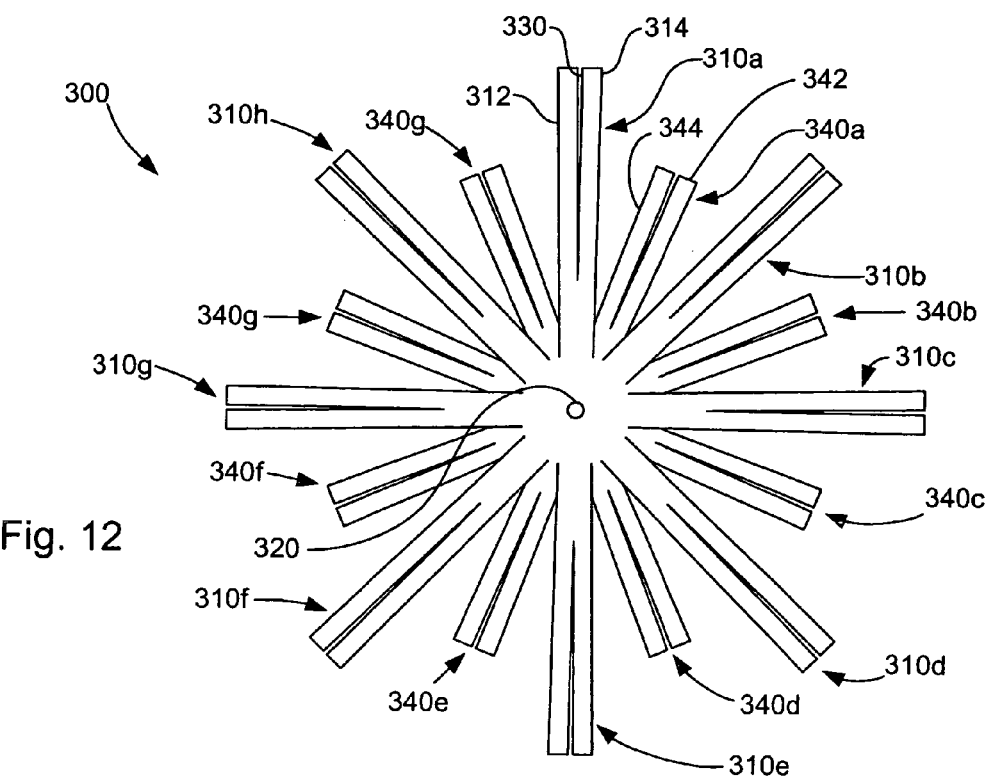
FIG. 12 is plan view of an alternative embodiment including a further, tertiary set of shortened legs projecting between primary legs.

FIG. 12 is plan view of an alternative embodiment 300 including shortened tertiary legs 340 disposed between primary legs 310. The device 300 includes a central hub area 302 and eight flexible primary legs or projections 310a through 310h extending radially outward from the hub 302 in a common plane. Shortened, tertiary legs 340a through 340h extend radially outward from the hub 302, each tertiary leg being disposed between adjacent primary legs. Each of the primary legs 310 and tertiary legs 340 is formed from two flexible secondary legs. For example, primary leg 310a comprises secondary legs 312 and 314 and tertiary leg 340a comprises secondary legs 342 and 344. The hub 302 includes an aperture 320 extending through the center of the hub 302. The aperture 320 is dimensioned and configured to allow passage of a fishing line 10 through the hub 302 when securing the device near a lure (see FIGS. 3–9).

The primary 310 legs provide forward and rearward action similar to that described for FIG. 11. Due to the reduced length and surface area of the tertiary legs 340, however, the forces acting upon the tertiary legs 340 are reduced from those that act upon the primary legs 310 and the arc of travel for the tertiary legs 340 is concomitantly reduced. As the device 300 is drawn through the water, therefore, not only do the secondary legs 312, 314, 342, 344 deviate slightly from the plane of the primary legs 310 and tertiary legs 340 (as do secondary legs in devices 100 and 200), but further, the tertiary legs 340 deviate substantially from the plane of the primary legs 310. This action causes the device 300 to morph during pulsed retrieval from a relatively coplanar disposition of legs or projections to a "three-dimensional" display of primary 310, secondary 312, 314 and tertiary 340 legs each moving in independent forward and rearward arcs of travel.

It is to be understood that while certain forms of this invention have been illustrated and described, it is not limited thereto except insofar as such limitations are included in the following claims and allowable equivalents thereof.

Having thus described the invention what is claimed as new and desired to be secured by Letters and Patent is as follows:

1. A fishing lure apparatus comprising:

a skirt of a thin flat resilient material having a hub through which a fishing line passes to define a direction of advancement of the lure through the water when in use, said skirt including a plurality of circumferentially spaced, resilient primary legs each defining an area and extending radially outwardly from said hub and said line generally in a common plane when the skirt is at rest, each of said primary legs presenting an outer end, said primary legs comprising circumferentially-spaced groups of secondary, substantially parallel legs, each of said secondary legs being smaller than the primary legs in a single dimension, said secondary legs comprising each group of secondary legs being disposed in side-by-side relationship to define the entire area of said corresponding primary legs, each of said groups of secondary legs presenting a corresponding primary leg and including free strips of said resilient material having inner ends joined together exclusively at said hub, said strips of each group extending from said hub in side-by-side relationship and having free ends that define said outer end of the respective primary leg, the outer ends of the primary legs defining the perimeter of the skirt whereby the primary legs exhibit first order movements and the secondary legs exhibit second order movements in response to force applied to said hub by said line when the lure is in use.

2. The fishing lure apparatus as claimed in claim 1, wherein said skirt further includes a plurality of circumferentially spaced, resilient tertiary legs extending radially outwardly from said hub and said line generally in said plane, each of said tertiary legs being shorter than said primary legs and disposed between a respective pair of adjacent primary legs.

3. The fishing lure apparatus as claimed in claim 1, wherein said hub has a generally radially extending slit therein between each of said primary legs to provide an axis of bending movement for each of the primary legs independent of the movements of the secondary legs.

* * * * *